United States Patent [19]
Hafner et al.

[11] Patent Number: 5,579,944
[45] Date of Patent: Dec. 3, 1996

[54] MULTI-LAYER GASKET FOR AN AEROSOL CONTAINER

[75] Inventors: Hans Hafner, Yonkers; Timothy O'Toole, Yorktown Heights, both of N.Y.

[73] Assignee: Precision Valve Corporation, Yonkers, N.Y.

[21] Appl. No.: 340,817

[22] Filed: Nov. 17, 1994

Related U.S. Application Data

[63] Continuation of Ser. No. 180,525, Jan. 12, 1994, abandoned, which is a continuation of Ser. No. 893,905, Jun. 4, 1992, abandoned, which is a continuation of Ser. No. 552,299, Jul. 18, 1990, abandoned.

[51] Int. Cl.$^6$ ................................................. B65D 41/10
[52] U.S. Cl. ...................... 220/310.1; 220/378; 220/614; 215/347
[58] Field of Search ................................. 215/324, 327, 215/347, 348, 349, 350, 351, 352; 220/310, 378, 614; 277/227, 228, 233, DIG. 6, 180, 166; 428/516

[56] References Cited

U.S. PATENT DOCUMENTS

| | | |
|---|---|---|
| 766,855 | 8/1904 | Weeden . |
| 1,800,791 | 4/1931 | Gunter . |
| 2,205,910 | 6/1940 | Raybould ..................... 288/19 |
| 2,275,235 | 3/1942 | Shanklin et al. ............... 220/46 |
| 2,717,023 | 9/1955 | Hetherington ................ 154/33.1 |
| 2,767,768 | 10/1956 | Jelinek ........................ 154/33.1 |
| 2,829,790 | 4/1958 | Isele-Aregger . |
| 2,866,731 | 12/1958 | Van Epp ........................ 154/130 |
| 2,951,721 | 9/1960 | Asp ........................ 277/DIG. 6 X |
| 2,953,399 | 9/1960 | Weaver et al. ................. 285/374 |
| 3,061,130 | 10/1962 | Husum . |
| 3,126,591 | 3/1964 | Hamilton ..................... 20/69 |
| 3,147,874 | 9/1964 | Hundt et al. . |
| 3,202,308 | 8/1965 | Botkin . |
| 3,273,743 | 9/1966 | McColl ........................ 220/46 |
| 3,342,381 | 9/1967 | Simons et al. ............. 220/614 X |
| 3,493,453 | 2/1970 | Caresa ........................ 156/293 |
| 3,580,870 | 5/1971 | Rosner ..................... 220/614 X |
| 3,582,095 | 6/1971 | Chalet du Dyck ............. 277/233 |
| 3,595,419 | 7/1971 | Dukess . |
| 3,700,524 | 10/1972 | Sato ........................ 220/614 X |
| 3,737,169 | 6/1973 | Glynn ........................ 277/235 |
| 3,770,285 | 11/1973 | Grover ........................ 277/165 |
| 3,788,654 | 1/1974 | Mandley ..................... 277/229 |
| 3,819,460 | 6/1974 | Dukess ........................ 161/42 |
| 3,917,100 | 11/1975 | Dukess ........................ 215/329 |
| 3,944,235 | 3/1976 | Gordon ........................ 277/22 |
| 3,976,217 | 8/1976 | Dukess ........................ 215/329 |
| 4,040,636 | 8/1977 | Albertson et al. ............. 277/188 A |
| 4,089,283 | 5/1978 | Mertens et al. ............. 220/614 X |
| 4,089,434 | 5/1978 | Tagalakis et al. ............. 215/260 |
| 4,111,323 | 9/1978 | Ichinose et al. ............. 215/230 |
| 4,128,251 | 12/1978 | Gaither et al. ............. 277/233 |
| 4,206,927 | 6/1980 | Garascia ..................... 277/12 |

(List continued on next page.)

*Primary Examiner*—Gary E. Elkins
*Assistant Examiner*—Stephen Cronin
*Attorney, Agent, or Firm*—Kilgannon & Steidl

[57] ABSTRACT

A multi-layer gasket for providing a seal between a mounting cup and a container comprising a middle layer of rigid plastic material and inner and outer layers of softer plastic material. The middle layer supports the inner and outer layers, which provide sealing surfaces with the mounting cup and the container bead. A gasketed mounting cup comprising a panel, a skirt integral with and depending from the periphery of the panel, wherein the skirt is outwardly flared to form an annular channel for receiving a container bead that defines the container opening and a multi-layer gasket positioned in the channel portion of the mounting cup, which gasket comprises a middle layer of rigid plastic material, an inner layer of soft plastic material adjacent the channel of the mounting cup and an outer layer of soft plastic material for engaging the container bead. The middle layer is preferably high density polyethylene or polypropylene and the inner and outer layers are preferably linear low density polyethylene. A layer of thermally activated adhesive can be placed adjacent the inner layer.

40 Claims, 3 Drawing Sheets

U.S. PATENT DOCUMENTS

| | | | |
|---|---|---|---|
| 4,269,321 | 5/1981 | Ichinose et al. | 215/343 |
| 4,452,842 | 6/1984 | Broges et al. | 428/195 |
| 4,454,965 | 6/1984 | Kirk, Jr. | 222/153 |
| 4,519,618 | 5/1985 | Klingel, Sr. | 277/228 |
| 4,637,618 | 1/1987 | Valls | 277/152 |
| 4,693,483 | 9/1987 | Valls | 277/207 |
| 4,803,597 | 2/1989 | Watanabe et al. | 361/502 |
| 4,818,577 | 4/1989 | Ou-Yang | 428/36.5 |
| 4,997,193 | 3/1991 | Czernik | 277/233 |

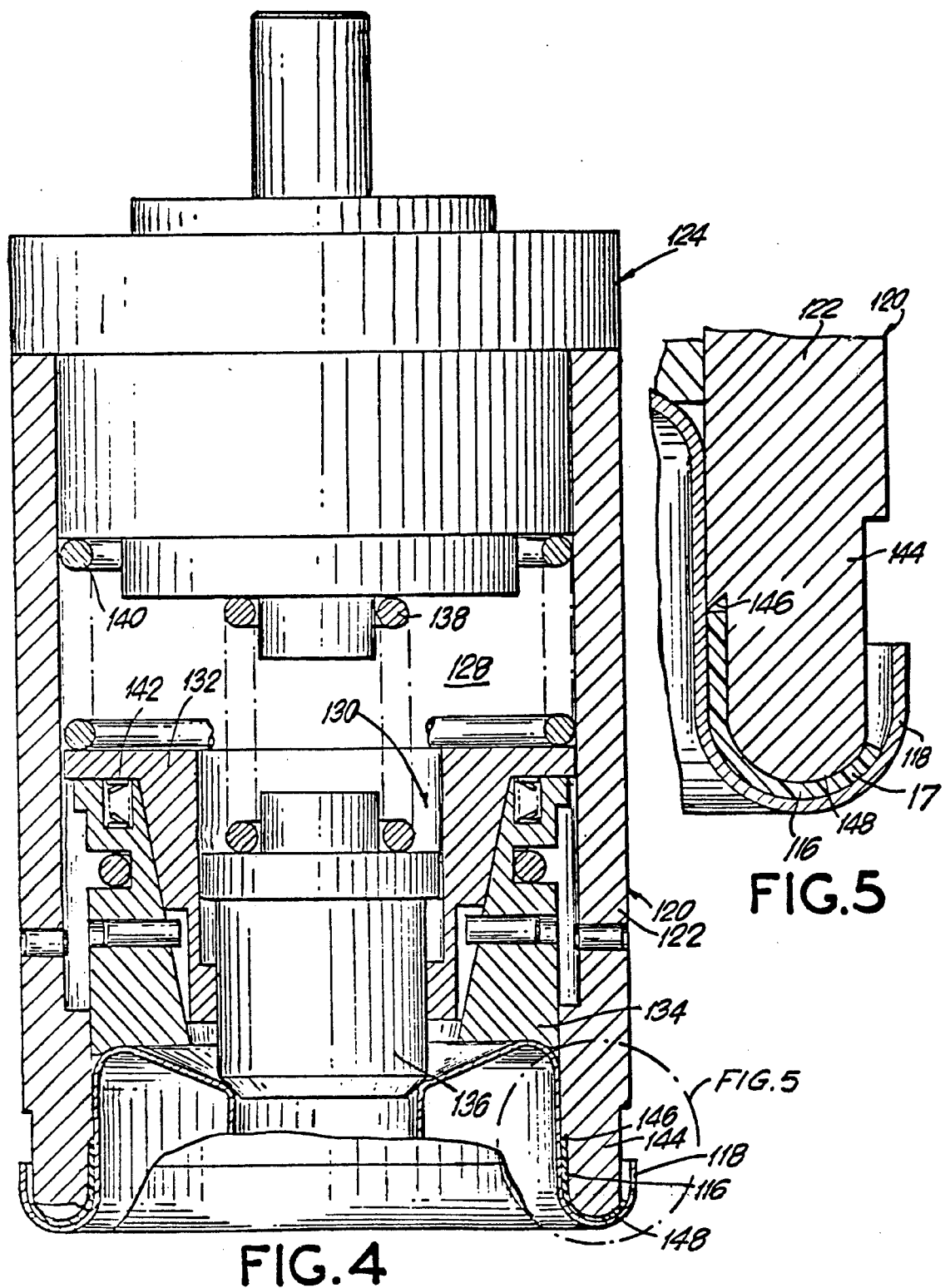

MULTI-LAYER GASKET FOR AN AEROSOL CONTAINER

This is a continuation of application Ser. No. 08/180,525 filed on Jan. 12, 1994 now abandoned, which is a continuation of U.S. Ser. No. 07/893,905 Jun. 4, 1992, now abandoned which is a continuation of U.S. Ser. No. 07/552,299 filed Jul. 18, 1990 now abandoned.

BACKGROUND

Aerosol dispensing containers have found widespread use in the packaging of fluid materials including a variety of both liquid and powdered particulate products. Such containers are provided with a valve-controlled discharge orifice and operate by the action of a volatile propellant which is confined within the container together with the product to be dispensed. Because the propellant has an appreciable vapor pressure at room temperature, the product in the closed container is maintained under super-atmospheric pressure.

A typical aerosol unit comprises a hollow cylindrical container which is tightly closed at one end and is provided with an opening at its opposite end for receiving a dispensing valve assembly. A closure, commonly referred to as a mounting cup, serves as the closure for the container and as a support for the valve assembly. Typically, the mounting cup comprises a pedestal portion for mounting the valve unit, a panel portion extending from the pedestal portion, a skirt portion depending from the periphery of the panel, and an annular channel portion extending outwardly from the skirt. When the mounting cup is placed in sealing position on the container, the channel is positioned over the bead surrounding the container opening and the lower portion of the skirt adjacent to the channel is flared or clinched outwardly against the container wall adjacent the bead. To ensure adequate sealing between the closure and the container, the cup is provided with a gasket in the channel, or predominantly in the channel, of the cup.

Heretofore, mounting cup seals have been formed by disposing a so-called "cup" gasket in the channel. This type of gasket has the disadvantage of not being stationary relative to the mounting cup during propellant filling or other valve unit assembly operations with the undesirable consequence that when the mounting cup and container are clinched to effect the seal, the gasket is often disposed at an angled position, and thus, the seal may be less effective.

Another commercial method for disposing the gasket onto the mounting cup consists in forming the gaskets in situ from liquid gasket-forming compositions comprising an elastomer dispersed or dissolved in volatile liquid vehicles, so called "flowed-in" gaskets. In the manufacture of such a gasket, the liquid composition is deposited in the desired configuration in the channel of the cup while the cup is rotated beneath a metering nozzle through which the gasket composition flows. The deposit is then converted into a dry solid sealing mass by expelling the liquid vehicle at elevated temperatures. Though this technique of flowing gaskets into place has received wide commercial acceptance, it suffers from the disadvantages of requiring an elaborate drying operation, wherein the mounting cup must be handled carefully so as to avoid undue upset from the horizontal. Costly recovery apparatus for the expelled liquid also must be provided. In sum, the flowed-in gasket is an expensive step in the formation of the mounting cup. See U.S. Pat. No. 3,342,381 as an example of the "flowed-in" gasket.

Other techniques for disposing a gasket onto the mounting cup are described in U.S. Pat. No. 3,417,177, wherein the gasket seal is made of heat shrinkable material. After placing a band of gasket material having a diameter greater than the outside diameter of the skirt of mounting cup, the cup is heated at a temperature and for a time sufficient to shrink the band into tight frictional engagement with the skirt.

Another similar technique is disclosed in U.S. Pat. No. 3,443,006 ("006"), wherein a band of gasket material is swelled through the use of a suitable swelling agent so as to increase its diameter to fit over the skirt of the mounting cup. Subsequently, the swelling agent is removed from the gasket material so that the band will come into tight frictional engagement with the skirt.

Both the heat shrink and swelling techniques for applying a gasket material to the mounting cup have the disadvantage of being costly and relatively time consuming procedures. Note in U.S. Pat. No. 3,417,177, column 4, lines 27–31, that the positioned bands must be heated to 240° F. for about 2–3 minutes in order to obtain a tight friction fit. In the procedure of the '006 patent, the bands must stand in the swelling liquid for a period of ½ to 1½ minutes according to example 2, and then allowed to stand for the drying period. Also, in any mass production utilizing the '006 system, an organic liquid recovery system must be employed.

In U.S. Pat. Nos. 4,546,525 and 4,547,948, a novel gasketed mounting cup system is described, including novel method and apparatus, wherein the gasket material is disposed on the mounting cup in the preferred position for effecting a seal between the mounting cup and the bead of the container; and further wherein the disadvantages associated with the aforementioned techniques of applying the gasket material to the cup are obviated. Also, an apparatus and method is provided wherein gaskets are applied to aerosol mounting cups in an exceptionally rapid and efficient manner to form gasketed-mounting cups having excellent sealing characteristics. In general, the method of invention of the aforesaid U.S. Pat. Nos. 4,546,525 and 4,547,948 comprises passing a tubular sleeve of gasket material onto a compressible mandrel; initially positioning and aligning the skirt of the mounting cup and the contiguous end of the mandrel such that the sleeve of gasket material may pass onto the skirt, said mandrel having fixed and moveable portions with respect to each other and to their movement toward and away from the mounting cup; urging the moveable portion of the gasket material bearing mandrel toward the mounting cup such that the gasket material passes onto the skirt of the cup; causing the moveable portion of the mandrel to retract to its initial position, cutting the sleeve at a point between the mounting cup and the mandrel to leave a band of gasket material; and subsequently, advancing the mounting cup to a station whereat the band of the gasket material is urged further onto the skirt of the mounting cup, whereby, the band of gasket material does not extend beyond the skirt of the mounting cup. Subsequently, the gasket is advanced to the ultimately desired position on the mounting cup.

U.S. Pat. No. 4,559,198 concerns a further refinement of a "sleeve" type gasket system which employs annular (or radial) compressive deformations or "ribs" in the band of gasket material. This ribbing imparts to the gasket a resistance to being dislodged during "under the cup" propellant filling operations. This ribbing also imparts to the gasket a resistance to being repositioned on the mounting cup by the gasket returning to its initial position.

In addition to the type of mounting cup gasket systems described heretofore, namely, "cut", "flowed-in" and "sleeve" gasket, a recent commercial system involves laminating a plastic material to a sheet of the metal and subsequently forming the laminated plastic sheet into a mounting cup. The thickness of the plastic laminate is usually on the order of 0.008–0.010", thinner than the sleeve gasket and substantially thinner than the cut or flowed-in gasket.

This variation in gasket thickness among the several gasket systems, further complicated by the fact that the channel portion of the mounting cups manufactured by the valve assembly plants and the annular beads of the aerosol container manufactured by container plants have nominal variations which are within quality control limits, often produce a defective seal in a completed aerosol product which may remain undetected until ultimately discovered by the consumer.

Recently, attention has been focused on modifications of the shape and configuration of the mounting cup used over the past twenty-five years in the aerosol industry. Such a modification is described in U.S. Pat. No. 4,792,067. This modification of the mounting cup comprises a channel portion for sealing with the bead of the container, the channel portion having an inner region contour being substantially different in shape from the inner surface contour of the annular bead of the container. The difference in the shape of the inner region contour of the channel portion from the shape of the inner surface contour of the annular bead allows only a portion of the inner region contour of the peripheral rim to contact the inner surface contour of the annular bead when the mounting cup is disposed on the container. The shape of the inner region contour of the peripheral rim is deformed when the mounting cup is crimped to the annular bead of the container. The deformation of the inner region contour reforms the shape of the inner region contour to be substantially the same shape as the inner surface contour of the annular bead to provide a sealing engagement between the mounting cup and the container.

Another modification of the shape and configuration of the mounting cup is described in International Application Number: US88/02489 and corresponding U.S. Ser. No. 312,392. This modification of the mounting cup comprises a non-deformable, annular indent or depression in the curved portion of the channel portion of a gasketed mounting cup. This indent is designed to retain its shape through the clinching process, after which it provides an annular band of enhanced sealing between the mounting cup and the bead of the container.

Despite the attempts to modify the gasket and the mounting cup to improve the reliability of the seal between the channel portion of the mounting cup and the annular bead of the aerosol container, gaskets still become twisted and deformed, particularly during the filling of the container with propellant. The gasket can then be blown into the container or joined to the bead of the container, forming an imperfect seal. Such distortions of the gasket are caused in part by the inherent flexibility of the linear low density polyethylene ("LLDPE") commonly used to form such gaskets. Replacement of LLDPE with high density polyethylene ("HDPE") does not improve the seal. Since the HDPE is rigid, it conforms poorly to the metal of the mounting cup and has insufficient resilience to form a good seal.

The seal between the mounting cup and the aerosol container remains of great concern to both the valve assembly plants and the filling plants since it must be capable of being gas tight for a period of years. In addition, the seal between the mounting cup and the aerosol container must be low in cost to enable aerosol products to be competitive with non-aerosol products in the consumer market.

SUMMARY OF THE INVENTION

The present invention is a multi-layer gasket for providing a seal between a mounting cup and a container. The gasket comprises a middle or intermediate layer of rigid plastic material. The gasket further comprises an inner (or first) and outer (or second) layer of softer plastic material adjacent both sides of the middle layer. The middle layer is preferably high density polyethylene or polypropylene while the inner and outer layers are preferably linear low density polyethylene.

The present invention also comprises a gasketed mounting cup comprising a panel and a skirt integral with and depending from the periphery of the panel. The skirt is outwardly flared to form an annular channel for receiving a container bead defining the container opening. The mounting cup includes a multi-layer gasket comprising a rigid plastic layer. An inner layer of softer plastic material lies adjacent to the surface of the channel of the mounting cup and a surface of the middle layer. An outer layer of softer plastic material for engaging the container bead lies adjacent an opposite surface of the middle layer. The middle layer is preferably high density polyethylene or polypropylene while the inner and outer layers are preferably linear low density polyethylene.

The multi-layer gasket of the present invention can also include a layer of adhesive, preferably thermally activated adhesive, adjacent the inner layer.

BRIEF DESCRIPTION OF THE DRAWINGS

FIG. 4 is a partial sectional view of the apparatus used to advance the multi-layer gasket from an initial position on a mounting cup to its final position partially in the channel of the mounting cup;

FIG. 5 is an enlarged partial sectional view of the circled portion of FIG. 3.

DESCRIPTION OF THE INVENTION.

Figure 1:
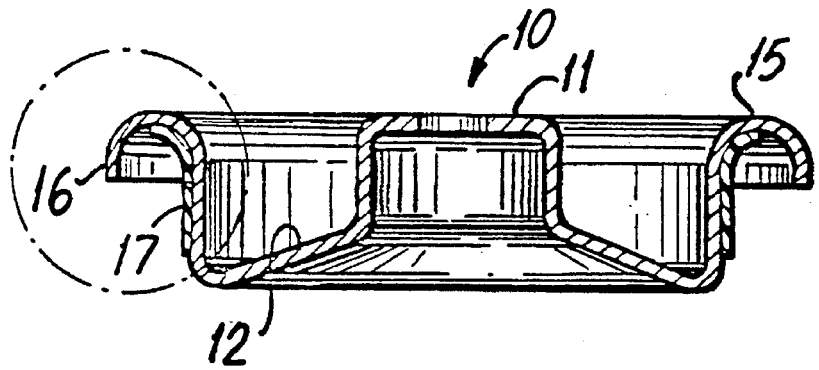
FIG. 1 is an elevated sectional view of the gasketed mounting cup of the present invention.
Figure 2:
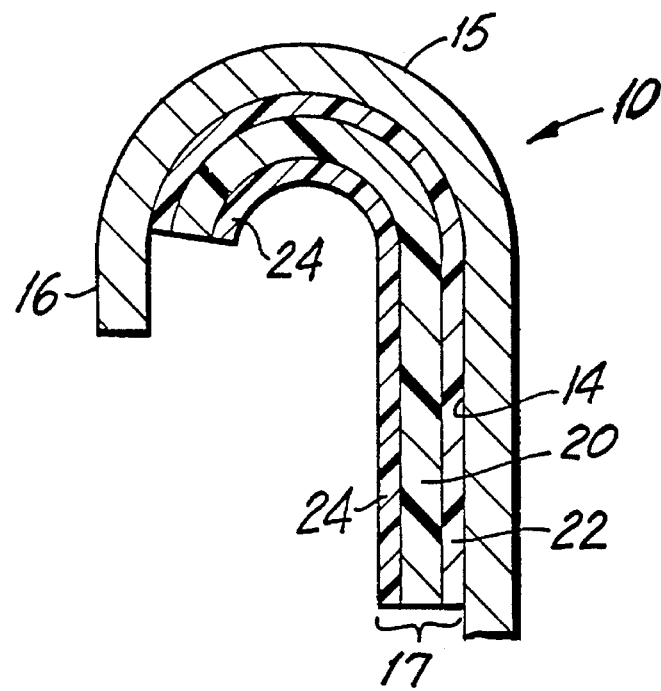
FIG. 2 is an enlarged, partial elevated sectional view of that portion of the mounting cup within the circular dotted line of FIG. 1, showing the multi-layer gasket of the present invention.

FIG. 1 shows an aerosol valve mounting cup of the present invention generally designated as 10 including the multi-layer gasket 17 of the present invention. The mounting cup has a pedestal portion 11 which rises from the interior edge of a panel portion 12. A skirt 14 rises from the exterior edge of the panel portion 12 opposite the pedestal portion and concentric thereto. The top portion of the skirt 14 curves into a channel portion 15 which terminates in edge portion 16. The channel portion 15, the edge portion 16 and the top of the skirt 14 form an annular convex receptor for the standard bead 6f an aerosol container. A multilayer gasket 17 in accordance with the present invention is shown positioned partially along the skirt 14 and partially within the channel 15 of the mounting cup 10. FIG. 2 is an enlarged detail view of the circled portion of FIG. 1 showing the multilayer gasket 17 of the present invention, the upper portion of skirt 14, the channel portion 15 and the edge portion 16 in a sectional view.

The multi-layer gasket 17 of the present invention comprises a middle or intermediate layer 20 of the rigid plastic material, an inner or first layer 22 of soft plastic material adjacent one surface of the middle layer 20 and an outer or second layer 24, also of soft plastic material, adjacent the opposite surface of the middle layer 22. The middle layer needs to be rigid enough to provide support for the gasket 17, preventing deformation of the gasket which could interfere with sealing. The inner and outer layers need to be soft enough to provide effective seals with the mounting cup and container bead. The middle layer 20 is preferably thicker than the outer layers.

The middle layer could be any rigid plastic material such as high density polyethylene ("HDPE"), other rigid polyethylenes, such as low density polyethylene ("LDPE") of suitable molecular weight, acrylonitrilebutadienestyrene (ABS), acetal, polyamide, polycarbonate, polypropylene or polyesters. HDPE and polypropylene are preferred. The particular plastic chosen needs be chemically resistant to the product to be dispensed and could therefore vary depending on the application. Altaven™6200B HDPE, available from Plastics Del Logo, C.A. Venezuela, is one preferred middle layer material. A similar preferred HDPE is Alathon L5840 from Occidental Chemical Corporation. Exxon PD 7292, a polypropylene copolymer, is also preferred. These materials have been found to have sufficient rigidity for this application and to extrude smoothly, easing manufacture of the gasket. Typical property data for these materials appear below:

| Altaven ™ 6200B | | | |
|---|---|---|---|
| Properties | Covenin Method | ASTM Method | Typical Value |
| Melt index | 1552 | D 1238 | 0.40 g/10 min |
| Density | — | D 1505 | 0.0958 g/cm$^3$ |
| Yield strength | 1357 | D 638 | 280 Kg/cm$^2$ |
| Tensile strength at break | 1357 | D 638 | 320 Kg/cm$^2$ |
| Elongation at break | 1357 | D 638 | >500% |
| Izod Impact strength | 822 | D 256 | 12 Kg. cm/cm |
| Environmental cracking resistance | — | D 693 | >400 hours |

| Properties | ASTM Method | Typical Values |
|---|---|---|
| Alathon L5840 | | |
| Density | D 792 | 0.958 g/cm$^3$ |
| Melt Index | D 1238, 190/2.16 | 0.40 g/10 min |
| High Load Melt Index, I-20 | D 1238, 190/21.6 | 34 g/10 min |
| Environmental Strees Crack | D 1693, A | 80° F. hrs. |
| Flexural Modulus | D 790, I/B | 180,000 lbs/in$^2$ |
| Tensile Yield Strength | D 638 | 4,300 lbs/in$^2$ |
| Elongation at Yield | D 638 | 16% |
| Tensile Impact Strength | D 1822, S | 92 ft-lbs/in$^2$ |
| Heat Deflection Temperature | D 648 (66) | 168°; 76° C. |
| Exxon PD7292 | | |
| Melt Flow Rate | D 1238 (230/2.16) | 4.0 g/10 min |
| Density | D 792 | 0.90 g/cc; 900 kg/m$^3$ |
| Tensile Strength & yield (50 mm/min) | D 638 | 4200 psi; 29 Mpa |
| Elongation & Yield (50 mm/min) | D 638 | 12% |
| Flexural Modulus 1% Secant (1.3 mm/min) | D 790A | 155,000 psi; 1070 Hpa |
| Izod Impact Strength Notched @ 23° C. | D 256 | 2.0 ft-lb/in; 35 J/M |
| Gardner Impact Strength −30° C. 3.2 mn specimen | D 3029 Method G | 180 in-lb; 20 J |
| Heat Deflection Temperature @ 455 kPa | D 648 | 185° F.; 85° C. |

The inner and outer layers, 22 and 24, need to be soft enough to provide seals against the inner surface of the gasket 14 and the bead of the container (not shown). The type of plastic chosen for a particular application needs to be chemically resistant to the product to be dispensed. These layers also need to be resistant to cold-flow, which could deform the gasket and cause a slow leak. Suitable materials include soft polyethylene, particulary low density and more particularly, linear low density polyethylene, elastomers, polyurethane, ethylvinylacetate (EVA) copolymer, ethylene-ethyl acrylate copolymer, polyethylene-butyl compounds, polyester elastomers and polyisobutylene modified by the addition of other polymers, such as polyethylene, for firming and toughening. Preferred inner layer materials include linear low density polyethylene, such as LL-2102 from Exxon and G-Resin 7340 from Union Carbide. It is preferred that the inner and outer layers be the same for simplicity in manufacture, but it is possible to use different materials for each layer as well.

Typical property data for Exxon 2102 and G-Resin 7340 appear below:

| Property | Test Method | Typical Values |
|---|---|---|
| EXXON LL-2102 | | |
| Melt Index | D 1238 | 0.8 dg/min |
| Density | D 1505 | 0.531 oz/in$^3$; 920 kg/m$^3$ |
| Melting Point | Exxon Method | 245.3° F.; 118.5° C. |
| Tensile Strength | D 638 | 2200 psi; 15.2 MPa |
| Ultimate Elongation | D 638 | 600% |
| Flexural Modulus, 1% Secant | D 790 | 36000 psi; 248 MPa |
| Dart Drop Impact Strength, $F_{50}$ @ −40° C. | D 3029 | 45 Ft-lb; 61 J |
| Brittleness Temperature | D 746 | <−148° F.; <−100° C. |
| Environmental Stress Crack Resistance, $F_0$ | D 1693 | |
| 10% "Igepal" | | >1000 hr |
| 100% "Igepal" | | >1000 hr |
| G - RESIN 7340 | | |
| Melt Index | D 1238 | 0.8 |
| Density | D 1505 | 0.920 g/gm |
| Secant Modules of Elasticity, 1% Elongation | D 638 | 34.000; 234 Mpa psa |
| Tensile Strength | D 638 | 2.250; 15.5 Mpa psa |
| Ultimate Elongation | D 638 | 600% |
| Bent Strip Crack Resistance, hrs$^{(x)}$, F | | |
| 100% "Igepal" | D 1693 | >500 |
| 10% "Igepal" | | >500 |
| Brittleness Temperature | D 746 | Below −100° C. |
| Flex. Life, Cycles to Fail$^{(x)}$ | UCC Method | 140,000 |
| Minimum Shear Rate To Melt Fracture, sec$^{−1(x)}$ | UCC Method | 4,000 |

The thickness of the middle layer 20 is preferably between about 0.004–0.012 inches for the nominal 1 inch diameter mounting cup. The thickness of the inner and outer layers 22 and 24 is preferably between about 0.0005–0.005 inches. If the inner and outer layers are thicker, it could allow cold-flow. The total thickness of the gasket is preferably about 0.014 inches.

The inner layer 22 and the outer layer 24 are preferably of two different colors. The middle layer 20 is preferably not colored. The juxtaposition of two different colors results in a third color, which allows for simple, visual quality control. The appearance of the color of either of the colored layers instead of the expected resultant color indicates that a portion of a layer is missing or too thin. For example, the inner layer has been colored red and the outer layer blue. A purple sleeve of gasket material indicates that the inner and outer layers are present. Variations in the shade or coloring of the sleeve indicates that the multi-layer gasket is defective.

Figure 3:
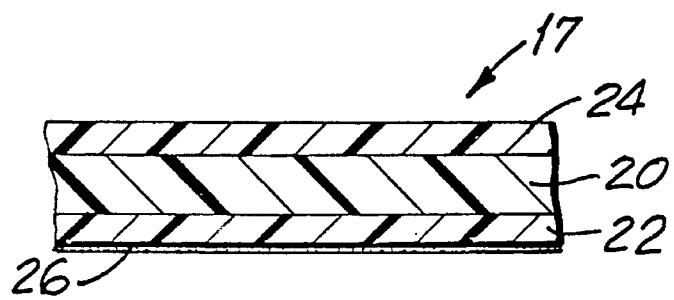
FIG. 3 is a sectional view of the multi-layer gasket of the present invention, including an adhesive layer.

The multi-layer gasket 17 of the present invention provides sealing and reliability superior to prior art gaskets. If it is desired to even more securely adhere the gasket to the mounting cup, an adhesive layer 26 can be added to the exterior of the inner layer 22 of the multi-layer gasket adjacent the mounting cup 10, as shown in FIG. 3. The adhesive layer is preferably between about 0.0005–0.0015 inches thick. 0.0007 inches is presently preferred.

Preferably, the adhesive is a thermally activated adhesive, as disclosed in U.S. Ser. No. 07/430,102, assigned to the assignee of the present invention and incorporated by reference herein. The thermally activated adhesive preferably would not be activated until the gasket is advanced to its final position in the channel as described below. The bonding material may be applied to the entire surface of the gasket material that is contiguous to the mounting cup, disposed in stripe form on the gasket, or formed as stripes having an apex in that portion of the bonding material distal to the gasket material.

The temperature-activable material forming the bond between the gasket and mounting cup may result in the formation of an adhesive bond, a stronger interference fit between gasket and mounting cup, or a combination of both adhesion and interference fit.

While the temperature-activable bonding material may be any adhesive resin compatible with the gasket material chosen, the product and other components of the aerosol container, it has been found that with conventional LLDPE gaskets that BYNEL™ 3101, an ethylene based polymer containing a combination of ester and acidic comonomer functionality, available from the DuPont Company, modified with LLDPE to improve chemical resistance and ease of processing, is preferred. 64.87% Bynel CXA 101 is mixed with 34. 67% Exxon LL 2102 and blue colorant, such as PB-3963 available from H. Kohnstann Company.

Typical property data for BYNEL™ CXA 3101 follows. Exxon LL 2102 is described above.

| Property | Test Method | Typical Values |
| --- | --- | --- |
| Melt Index | ASTM D-7139 | 3.5 dg/min. |
| Density | ASTM D-1505 | 943 kg/m$^3$; 0.943 gr/cc |
| Melting Point | DSC | 87° C.; 199° F. |
| Freezing Point | DSC | 69° C.; 156° F. |
| Vicate Softening Point | ASTM D-1525 | 65° C.; 149° F. |
| Tensile Strength | ASTM D-170 | 813.26 mPa; 1.920 psi |
| Tensile Modulus | ASTM D-170 | 832.999 mPa; |

-continued

| Property | Test Method | Typical Values |
| --- | --- | --- |
| Elongation at Break | ASTM D-1708 | 478 psi 64% |

It is important that the temperature-activable bonding material have the capability of being converted to the bonding state at a temperature below the distortion temperature of the gasket material. Preferably, the temperature that converts the bonding material to the bonding state is at or near that generated by the heated mounting cup when the gasket is at its ultimate position on the mounting cup, so as not to deposit said substance onto the skirt portion of the mounting cup as the gasket is advanced to its ultimate position during the secondary plunger action, as is described below.

The multi-layer gasket 17 can be made in a conventional manner through extrusion under ordinary processing conditions for the chosen plastics. If the inner and outer layers are the same, two extruders may be used to form a sleeve of gasket material. If the inner and outer layers are of different materials or are colored differently, 3 extruders are used. If an adhesive layer is added, a fourth extruder is required. The adhesive layer would be the innermost layer of the sleeve. To form a friction fit between gasket material and the skirt of the mounting cup, the inside diameter of the gasket material is slightly less than the outside diameter of the skirt portion of the mounting cup. A preferred outer diameter for the sleeve is approximately 0.975 inches.

The sleeve is preferably placed on the mounting cup 10, cut and inserted into the channel 15 of a mounting cup through an apparatus and method disclosed, for example, in U.S. Ser. No. 07/371,685 and U.S. Pat. No. 4,559,198, both assigned to the assignee of the present invention. U.S. Ser. No. 07/371,685 and U.S. Pat. No. 4,559,198 are incorporated by reference herein.

Subsequent to the initial advance of the gasket material onto the skirt of the mounting cup, the mounting cup is passed on conventional tracking through a zone wherein the band of gasket and bonding material is heated by conventional heating means through heat exchange with the mounting cup. For example, the heating zone is a conventional mounting cup tracking in indirect heat exchange with an insulated heat water system, said water system being capable of close control through heated water control systems. The mounting cup is heated to a temperature of 200°–225° F. A temperature of 218°–225° F. has been found satisfactory. Alternatively, and preferably, the mounting cup is heated by a conventional radio frequency system (RF.).

From the heating zone the mounting cups are passed to a secondary plunger station for final positioning of the gasket. The plunger for advancing the gasket at the secondary plunger station is shown in FIG. 3. The plunger of FIG. 3, generally designated as 120, comprises an outside sleeve portion 122, a head portion 124, and a chuck portion 126. The chuck portion is attached to a plunger advancing mechanism (not shown). The head portion 124 and sleeve portion 122 define a recess 128. Within the recess 128 is a mounting cup stripping member, generally designated as 130, which comprises slidable mating portions 132 and 134, and a mounting cup centering member, 136, which centering member 136 is biased away from the head portion 124 by a spring 138. Mating portion 132 of the mounting cup stripping member 130 is biased away from the head portion 124 by a spring 140. Mating portion 134 of the mounting cup stripping member 130 is biased away from mating portion 132 by spring 142.

Figure 6:
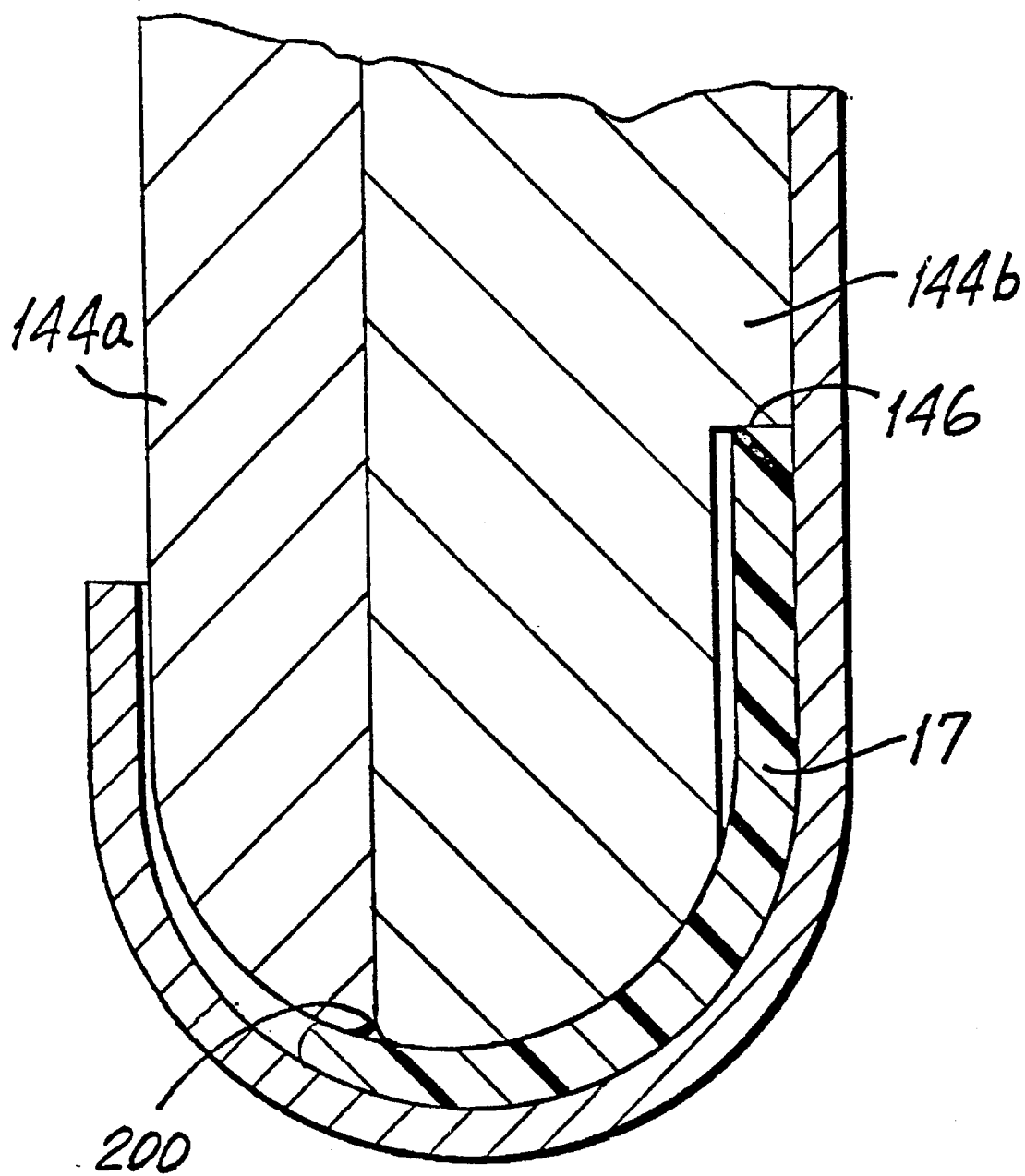
FIG. 6 is an enlarged partial sectional view of a two piece sleeve used in placing the multi-layer gasket of the present invention into the channel of a mounting cup.

The sleeve 122 has a lower portion 144 having an annular shoulder 146. The shoulder portion 146 engages the gasket material 116 while advancing the gasket to its ultimate position on the mounting cup 118. Unlike the edge of the sleeve in U.S. Pat. No. 4,559,198, the bottom edge 148 of the sleeve 122 may be smooth, as shown in FIGS. 3–4. The multilayer gasket of the present invention can securely seal the mounting cup and container bead without the use of the ribbing taught in U.S. Pat. No. 4,559,198. If desired for additional security, such ribbing can be added. FIG. 6 shows a modified two piece sleeve presently preferred for use with the multi-layer gasket. The radiused intersection 200 between the two pieces 144a and 144b allows for more precise positioning of the multi-layer gakset 17.

In operation, the mounting cups 118 are suitably placed at the secondary plunger station. When in place, the plunger 130 is advanced toward the mounting cup 118. The mounting cup is centered relative to the plunger 120 by the mounting cup centering member 136. Also, the mounting cup stripping member 130 is brought into contact with the cup, as shown in FIGS. 3. Upon advancing the plunger 120, the sleeve 122 moves to engage the shoulder 146 against the gasket material 116, urging the gasket material 116 further onto the skirt of the mounting cup 118, and ultimately advancing the gasket material to the final position shown in FIG. 3–4. As shown in FIG. 4, the edge 148 of the sleeve 122 terminates its advance by bottoming against the walls 152 of the channel of the mounting cup.

During retraction of the plunger 120, the mating portion 134 of the mounting cup stripping member 130 is biased against the mounting cup 118 by the spring 142 until the sleeve 122 moves clear of the advanced gasket, thus precluding the retracting sleeve 122 from lifting the mounting cup 118. Obviously, the springs 140 and 142 must be designed to permit mating portion 132 to advance toward mating portion 134 during the advance of the plunger 120.

Preferably, following the advance of the gasket material to its ultimate position on the mounting cup, the gasketed mounting cup is cooled to room temperature.

The multi-layer gasket of the present invention combines advantageous sealing and adhesion characteristics of soft plastics with the support provided by more rigid plastics to form a gasket superior to those of the prior art. The gasketed mounting cup of the present invention can therefore be more securely and reliably sealed to the bead of an aerosol container than prior art mounting cups.

What is claimed is:

1. A pliable multi-layer gasket for providing a seal between a mounting cup and a container bead, the gasket having a central opening for receiving the mounting cup comprising an intermediate layer of firm plastic material and first and second layers of softer plastic material, said first layer being adjacent one side of said intermediate layer and said second layer being adjacent the opposite side of the intermediate layer, both first and second layers being co-terminus with the area of the intermediate layer.

2. The multi-layer gasket of claim 1, wherein said intermediate layer is polypropylene.

3. The multi-layer gasket of claim 1 wherein said gasket is in the form of a sleeve.

4. The multi-layer gasket of claim 1, wherein said intermediate layer is chosen from the group consisting of polyethylene, acrylonitrilebutadienestyrene, acetal, polyamide, polycarbonate, polypropylene or polyester.

5. The multi-layer gasket of claim 1 wherein said intermediate layer comprises high density polyethylene.

6. The multi-layer gasket of claims 1, 4 or 5, wherein said second layer is chosen from the group consisting of polyethylene, elastomers, polyurethane, ethylvinylacetate (EVA) copolymer, ethylene-ethyl acrylate copolymer, polyethylene-butyl compounds, polyisobutylene or polyester elastomers.

7. The multi-layer gasket of claims 1, 4 or 5, wherein said intermediate layer is thicker than said first and second layers.

8. The multi-layer gasket of claims 1, 4 or 5, wherein said first and second layers are different colors.

9. The multi-layer gasket of claims 1, 4 or 5, wherein said first layer is chosen from the group consisting of polyethylene, elastomers, polyurethane, ethylvinylacetate (EVA) copolymer, ethylene-ethyl acrylate copolymer, polyethylene-butyl compounds, polyisobutylene or polyester elastomers.

10. The multi-layer gasket of claim 9, wherein said intermediate layer is between about 0.004–0.012 inches and said first and second layers are between about 0.0005–0.005 inches.

11. The multi-layer gasket of claims 1, 4 or 5, wherein said first layer is chosen from the group consisting of linear low density polyethylene or low density polyethylene.

12. The multi-layer gasket of claim 11, wherein said intermediate layer is between about 0.004–0.012 inches, and said first and second layers are between about 0.0005–0.005 inches.

13. The multi-layer gasket of claim 11, wherein said second layer is the same as said first layer.

14. The multi-layer gasket of claim 13, wherein said intermediate layer is between about 0.004–0.012 inches, and said first and second layers are between about 0.0005–0.005 inches.

15. The multi-layer gasket of claim 13, further comprising a thermally activated adhesive adjacent said first layer.

16. The multi-layer gasket of claim 13, wherein said first and second layers are different colors.

17. The multi-layer gasket of claims 1, 4 or 5, wherein said second layer is chosen from the group consisting of linear low density polyethylene or low density polyethylene.

18. The multi-layer gasket of claim 17, wherein said second layer is the same as said first layer.

19. The multi-layer gasket of claim 18, further comprising a thermally activated adhesive adjacent said first layer.

20. The multi-layer gasket of claim 18, wherein said first and second layers are different colors.

21. The multi-layer gasket of claims 1, 4 or 5, further comprising an adhesive layer adjacent said first layer.

22. The multi-layer gasket of claim 21, wherein said adhesive is a thermally activated adhesive.

23. A gasketed mounting cup comprising a panel, a skirt integral with and depending from the periphery of said panel, said skirt being outwardly flared to form an annular channel for receiving a container bead that defines the container opening, and a pliable, multi-layer gasket positioned in the channel portion of the mounting cup, said pliable, multi-layer gasket comprising an intermediate layer of firm plastic material and first and second layers comprising soft plastic material, said first layer being adjacent the channel of the mounting cup and a surface of said intermediate layer and said second layer adjacent an opposite surface of said intermediate layer for engaging the container bead, both first and second layers being co-terminus with the area of the intermediate layer.

24. The gasketed mounting cup of claim 23, wherein said intermediate layer is polypropylene.

25. The gasketed mounting cup of claim 23 wherein said first, second and intermediate layers consist essentially of thermoplastic material.

26. The gasketed mounting cup of claim 21, wherein said intermediate layer is chosen from the group consisting of polyethylene, acrylonitrilebutadienestyrene, acetal, polyamide, polycarbonate or polypropylene or polyester.

27. The gasketed mounting cup of claim 21, wherein said intermediate layer comprises high density polyethylene.

28. The gasketed mounting cup of claims 26 or 27, wherein said first and second layers are chosen from the group consisting of linear low density polyethylene or low density polyethylene.

29. The gasketed mounting cup of claim 28, wherein said intermediate layer is between about 0.004–0.012 inches, and said first and second layers are between about 0.0005–0.005 inches.

30. The gasketed mounting cup of claim 28, further comprising a layer of thermally activated adhesive between said first layer of said gasket and said channel of said mounting cup.

31. The gasketed mounting cup of claims 23, 26 or 27, further comprising a layer of adhesive between said inner layer of said gasket and said channel of said mounting cup.

32. The gasketed mounting cup of claim 31, wherein said adhesive is a thermally activated adhesive.

33. The gasketed mounting cup of claims 23, 26, or 27, wherein said first and second layers are chosen from the group consisting of polyethylene, elastomers, polyurethane, ethylvinylacetate (EVA) copolymer, ethylene-ethyl acrylate copolymer, polyethylene-butyl compounds, polyisobutylene or polyester elastomers.

34. The gasketed mounting cup of claim 33, wherein said intermediate layer is between about 0.004–0.012 inches, and said first and second layers are between about 0.0005–0.005 inches.

35. The gasketed mounting cup of claim 33, further comprising a layer of thermally activated adhesive between said first layer of said gasket and said channel of said mounting cup.

36. The gasketed mounting cup of claim 33 wherein said gasket is in the form of a sleeve.

37. A pliable, multi-layer gasket for being positioned partially within the channel of a mounting cup of an aerosol unit, the gasket having a central opening for receiving the mounting cup comprising an intermediate layer of plastic material and first and second layers of plastic material softer than said intermediate layer, wherein said intermediate layer is stiffer than said first and second layers, said first layer being adjacent one side of said intermediate layer and said second layer being adjacent the opposite side of the intermediate layer, said layers being essentially non-porous and being co-terminus with the area of the intermediate layer.

38. The multi-layer gasket of claims 1, 37, or 3 wherein said first, second and intermediate layers consist essentially of thermoplastic material.

39. A pliable, multi-layer sleeve gasket for being positioned partially within the channel of a mounting cup of an aerosol unit, the gasket having a central opening for receiving the mounting cup, comprising an intermediate layer of high density polyethylene and first and second layers of similar or dissimilar materials selected from the group of linear low density polyethylene and low density polyethylene, said first layer being adjacent one side of said intermediate layer and said second layer being adjacent the opposite side of the intermediate layer, both first and second layers being co-terminus with the area of the intermediate layer.

40. The gasket of claim 39 wherein said intermediate layer is thicker than said first and second layers.

* * * * *